3,212,905
PROCESS FOR MAKING CHEESE
Kei Arima, Komagome, Bunkyo-ko, Tokyo, and Shinjiro Iwasaki, Urawa-shi, Japan, assignors to Meito Sangyo Kabushiki Kaisha, Nagoya, Japan, a corporation of Japan
No Drawing. Original application Jan. 4, 1962, Ser. No. 164,393, now Patent No. 3,151,039, dated Sept. 29, 1964. Divided and this application June 25, 1964, Ser. No. 387,256
Claims priority, application Japan, July 20, 1961, 36/25,664
5 Claims. (Cl. 99—116)

This is a division of application Serial No. 164,393, filed January 4, 1962, and now U.S. Patent No. 3,151,039.

This invention relates to enzyme produced by fungi. More particularly, it relates to a novel milk coagulating enzyme "microbial rennet" obtained from the cultures of fungi selected from the group consisting of *Mucor pusillus* Lindt of genus Mucor, genus Rhizopus, genus Monascus, genus Ascochyta, genus Sclerotium, genus Colletotrichum, their varieties, and the natural and artificially induced mutants thereof which possess most of the characteristic properties of the parent fungi concerned; and the method of preparing the same. Additionally, the invention relates to a method of making cheese by using such as enzyme.

In the description to be given hereinafter the milk coagulating enzyme obtained by the cultivation of the aforementioned fungi will be referred to as "microbial rennet."

Heretofore, as a milk coagulating enzyme the so-called "rennet" that is obtained from the fourth stomach of sucking calves is well-known. Since this rennet is powerful in so far as its milk coagulating activity is concerned, it has been used widely as an enzyme indispensable for cheese making, and is still being used. However, inasmuch as the raw material used is the fourth stomach of sucking calves, there is a limit to the supply of raw material, and furthermore it is costly.

Generally, proteases coagulate milk. Hence, when viewed from the standpoint of coagulating activity the proteases such as those of animal origin, namely pepsin, trypsin, chymotrypsin, cathepsin, etc. and those of vegetable origin, namely, papain, ficin, bromelain, etc. all have milk coagulating activity to a certain degree. Also the coagulating activity of the proteases that are produced by bacteria such as, for example, *Pseudomonas fluorescens*, *Bacillus subtilis* and *Serratia marcescens* are already known. However, these proteases having high protein digesting activity and low protein coagulating activity, they cannot be put to practical use as milk coagulating enzymes.

Furthermore, as an enzyme produced from the cultures of fungi, there is also known a coagulating or curding enzyme that can be produced by cultivating specifically the fungus *Mucor rouxii* upon a suitable culture medium, preferably on rice. However, it is not known at all that by cultivating the fungus selected from the group as particularly specified in the present invention, enzyme having high milk coagulating activity but very low protease activity can be obtained in high yield in the medium, and that using thus obtained enzyme cheese can be made advantageously on a commercial scale.

In consequence of having furthered our studies concerning the products produced by the culture of microbes, fungi in particular, we found that it is possible to produce on a commercial scale and at low cost a novel milk coagulating enzyme "microbial rennet" having very low protease activity but remarkable high milk coagulating activity by utilizing those fungi, their varieties and the natural and artificially induced mutants thereof that possess most of the characteristic properties of the parent fungi concerned, which hitherto were considered as being unable to produce milk coagulating enzymes of any practical value; and that by using the "microbial rennet" it is possible to make cheese advantageously on a commercial scale.

Accordingly, the primary object of the present invention is to provide a novel milk coagulating enzyme "microbial rennet" having very low protease activity but remarkably high milk coagulating activity by cultivating fungus selected from the group consisting of *Mucor pusillus* Lindt belonging to the genus Mucor, genus Rhizopus, genus Monascus, genus Ascochyta, genus Sclerotium, genus Colletotrichum, their varieties and the natural and artificially induced mutants thereof that possess most of the characteristic properties of the parent fungi concerned.

It is another object of the invention to provide a method of producing "microbial rennet" by cultivating on a suitable medium a fungus selected from the group as mentioned hereinabove.

A still another object of the invention is to provide a method of collecting "microbial rennet" from the medium and preparing "microbial rennet" into its finished form.

A further object of the invention is to provide a method of making cheese using this "microbial rennet."

Other objects and advantages of the invention will be apparent from the following detailed description thereof.

According to our studies, the fungi that are capable of producing the novel milk coagulating enzyme, "microbial rennet," having very low protease activity but remarkably high milk coagulating activity include the fungi selected from the group consisting of *Mucor pusillus* Lindt belonging to the genus Mucor, genus Rhizopus, genus Monascus, genus Ascochyta, genus Sclerotium, genus Colletotrichum, their varieties, and the natural and artificially induced mutants thereof having most of the characteristic properties of the parent fungi concerned.

As already described, that *Mucor rouxii* produces upon a suitable culture medium, preferably on rice, a coagulating or curding enzyme is known. However, it is not known at all particularly that *Mucor pusillus* Lindt produces a milk coagulating enzyme having very low protease activity but remarkably high milk coagulating activity in high yield in the medium. Furthermore the genus Mucor covering a great number of species therein, it was found that many of the species do not produce enzymes possessing the desired milk coagulating activity. Moreover, *Mucor pusillus* Lindt clearly exhibits different characteristic properties from that of *Mucor rouxii*. On a Koji agar slant culture at 30° C., *Mucor pusillus* Lindt exhibits the characteristic properties as described hereinafter: Namely, the colony which is white at first, upon the formation of sporangia becomes gray or grayish-brown, the height of colony being less than 2 mm. The sporangiophores are at first transparent and colorless and do not branch, but subsequently branch with formation of sporangia on each of the tips thereof. The sporangiophores which are 5–20μ in width, upon maturity, become grayish in color, and in most instances the formation of septa occur near the tips. The sporangia have a lateral diameter of 40–90μ and are of either gray or grayish-brown color. The columellae are light brown in color and are either egg- or pear-shaped having longitudinal diameters of 10–50μ. The sporangiospores are spherical with diameters of 2.5–4μ. Neither chlamydospore nor zygospore is observed. While the description of those cultivated under other culture conditions will be omitted, those that have been cultivated by means of a culture medium such as malt agar, potato agar, possess properties that are substantially the same. When the chief points of difference between the characteristic properties of *Mucor pusillus* Lindt used in the present invention and that of *Mucor rouxii* are set forth, they are as shown in the following Table I.

itself will vary depending upon the adaptability of the fungus that is used for the production of "microbial rennet."

While the temperature of cultivation will vary depending on the fungus employed, usually between about 20–40° C. is suitable. It is usual to carry out the cultivation for about 2–7 days by means of liquid culture or solid

TABLE I

| Fungus | Characteristic Properties | | | | | Growth Temp. (° C.) |
|---|---|---|---|---|---|---|
| | Height of Colony (mm.) | Sporangium | Sporangiospore | | Chlamydospore | |
| | | | Shape | Diameter ($\mu$) | | |
| *M. pusillus* Lindt | 2 | Formed well | Spherical | 2.5–4 | Not formed | 15–50. |
| *M. rouxii* | 4 | Rarely formed | Egg-shaped or spheroidal. | 4–5 | Numerous formations. | 9–45. |

According to this invention the fungi selected from the group consisting of the genus Rhizopus, genus Monascus, genus Ascochyta, genus Sclerotium, genus Colletotrichum, their varieties, and the natural and artificially induced mutants thereof having most of the characteristic properties of the parent fungi concerned can also be used as the fungi for producing "microbial rennet." As fungi belonging to the foregoing fungi there can be named *Rhizopus delemar, Rhizopus niveus, Rhizopus nodesus, Rhizopus pseudochinensis,* Rhizopus Peka II, Rhizopus Peka I, *Rhizopus usamii, Rhizopus batatas, Rhizopus thermosus, Monascus anka, Ascochyta visa, Sclerotium oryzae-sativa, Colletotrichum atramentarium,* etc. As these fungi extend over a broad range, an enumeration of the properties of each will be omitted. However, in "The Genera of Fungi," by Frederic E. Clements and Cornelius L. Shear, published by Hafner Publishing Co., New York, 1957, there is described concerning the characteristic properties of the genus Rhizopus, genus Monascus, genus Ascochyta, genus Sclerotium, and genus Colletotrichum to which genera the foregoing fungi belong.

Next, will be described the method according to the invention, by which a fungus selected from the group consisting of *Mucor pusillus* Lindt belonging to genus Mucor, genus Rhizopus, genus Monascus, genus Ascochyta, genus Sclerotium, and genus Colletotrichum, their varieties, and the natural and artifically induced mutants thereof that possess most of the characteristic properties of the parent fungi concerned is cultivated, thereby effecting the production of "microbial rennet" in its medium, then concentrating and preparing the same. What is referred to as the concentrating, obtaining and preparing of "microbial rennet" in the invention denotes the process of obtaining "microbial rennet" in a still more refinable state than in its raw material state or in a state in which it is of a higher concentration or higher purity. According to the invention, the medium to be employed for cultivating the fungi, as to its composition, may be any suitable artificial or natural medium so long as it contains at least a carbon source, a nitrogen source and inorganic salts. As the carbon source, the monosaccharides, disaccharides and polysaccharides which are assimilable by the fungi, such as sucrose, lactose, glucose, starch, etc. can be used. Similarly in case of the nitrogen source, so long as they are assimilable, a wide range of nitrogen sources can be used such as inorganic ammonium salts, amino acids, and a wide variety of other protein substances, etc. The inorganic salts may also include, for example, phosphates, magnesium salts, calcium salts, and numerous other inorganic salts. In any event, the carbon or nitrogen source of the natural or artificial medium may be of any kind so long as it is utilizable by the fungus to be employed. As a preferred medium that of wheat bran may be given. It is to be understood, of course, that the amounts of carbon and nitrogen sources and the composition of the medium culture at a pH of 3–8, particularly 5–7, and preferably under aerobic conditions. Thus, while in case of liquid culture, surface culture may be employed, better results are obtained by means of shaking culture or submerged culture. As a result of cultivation, as described above, the milk coagulating enzyme, "microbial rennet," is produced in the medium. In order to collect the "microbial rennet" from the culture medium, in case of solid culture, it is accomplished by extracting with water or an aqueous solution, while in case of liquid culture it is done by removal of the mycelium whereby in both cases "microbial rennet" containing solution can be collected. As aqueous solvents there can be named the solutions containing salts such as sodium chloride, potassium chloride, etc., the solutions containing acids such as hydrochloric acid, citric acid, acetic acid, etc. as well as various other types of buffer solutions.

Thus obtained "microbial rennet" containing solution can then be concentrated or solidified by carrying out the purification treatments such as precipitation with organic solvents, salting out, concentration under reduced pressure, purification by means of ion exchangers etc. As precipitating solvents, water miscible organic solvents such as methanol, ethanol, isopropanol, acetone, etc. can be used. And as the salting out agents any of the salts that dissolve very readily in water may be used, such as ammonium sulfate, sodium sulfate, magnesium sulfate, etc.

"Microbial rennet," the novel milk coagulating enzyme according to the present invention, exhibits characteristics that are clearly different from the hitherto-known proteases of animal or vegetable origin or those proteases that are produced by other microbes.

"Microbial rennet" possesses powerful milk coagulating activity, but its protease activity is very weak. The milk coagulating activity of "microbial rennet," likewise as in the instance of rennet obtained from the fourth stomach of sucking calves, shows powerful activity in the acid side, and as the pH rises its potency decreases, no activity being manifested when the pH is in the alkaline side. Hence, in making cheese, "microbial rennet" can be used as in the conventional method.

When curds are formed, the nitrogen that transfers into the whey after 150 minutes was about 20% determined by the Kjeldahl method. Thus, since it resembles substantially the instances resulting from the use of rennet, the casein in the milk is advantageously utilized. When the protease activity of "microbial rennet" was measured by the Anson method, using respective amount of enzymes which show the same milk coagulating activity, the absorption at 660 m$\mu$ in case of the acid protease produced by *Aspergillus saitoi* was 0.641 (O.D.), and of rennet, 0.059 (O.D.), while that of "microbial rennet" of the present invention was less than 0.102 (O.D.), indicating that this enzyme was a completely different type of enzyme than the usual protease, its milk coagulating activity being unusually powerful as compared with its protease activity. Consequently, it is befitting to be referred to as "microbial rennet."

Since "microbial rennet," which is cultivated, collected and prepared as described hereinabove, is obtained by cultivating microbes, it is possible to mass-produce it very profitably from the economic standpoint on a commercial scale. Hence, while it is widely utilizable for making desserts, ice cream and for other uses such as preparation of confectionaries, it is particularly of great advantage in connection with cheese making.

In making cheese the step of producing a curd by adding to milk an enzyme to coagulate it is a necessary step for making any type of cheese. As the milk coagulating enzyme, rennet, which has already been mentioned, is well known, and as its milk coagulating activity is powerful, it is considered to be indispensable for the making of cheese. However, according to this invention, it is possible to provide cheese products of excellent quality very readily on a commercial scale without the employment of rennet.

In order to more clearly understand the present invention, several examples illustrating the mode of practicing the invention are given below, it being understood that the same are merely intended in an illustrative sense, and the invention should not be limited thereby, it being possible to make various changes as to the fungi employed, the composition of the medium, the method of collecting, etc. without departing from the spirit and scope of the invention.

Example 1

To 10 parts of wheat bran 7 parts of water was added thereon. After mixing, it was cooked for 30 minutes at 100° C. This was inoculated with a strain belonging to *Mucor pusillus* Lindt, and was incubated at 30° C., whereby on the 3rd day the milk coagulating activity reached its maximum. The wheat bran to which water was added in the proportion of 10 grams of the former to 50 ml. of the latter was allowed to stand at room temperature for 1 hour, after which the mycelium was separated by filtration and 40 ml. of "microbial rennet" solution was obtained. The milk coagulating activity of this extract was 800 Soxhlet units/ml. for a 10% solution of powdered skimmed milk containing $\frac{1}{100}$ M of $CaCl_2$. Consequently, from 10 grams of wheat bran were obtained 32,000 units of "microbial rennet." Next, by salting out this extract with ammonium sulfate of 0.22–0.66 saturation, practically all of its activity could be transferred to the precipitate portion. Furthermore, activity recoveries of 78%, 80%, 60% and 75% were shown respectively by means of organic solvents of the following concentrations: namely, ethanol 70%, methanol 75%, acetone 66% and isopropanol 70%. The activity of "microbial rennet" thus obtained was 100 Soxhlet units/mg., while that of the rennet tablets of Chr. Hansen's Laboratory, Inc., was 200 Soxhlet units/mg.

Then "microbial rennet" of the invention was used and cheese was made. Namely, to 55 kg. of raw milk mixed with 15 kg. of skimmed milk which were maintained at 30° C. were added 13 grams of $KNO_3$ followed by 8.5 grams of $CaCl_2 \cdot 2H_2O$ and 1 kg. of starter. Ten minutes later, 5 grams of "microbial rennet" obtained as described above was added, and the mixture was stirred. After 25 minutes' standing, the curd was formed and cutting thereof was performed. Cooking was carried out in three consecutive steps at 33° C., 36° C. and 38° C., and after 1 hour and 20 minutes of cooking at 38° C., 120 grams of sodium chloride was added. The draining of the whey from the curd was normal, and the texture of the curd was fine and smooth. Thus was obtained 6.3 kg. (yield 8.9%) of green cheese.

Example 2

A medium containing 10% of powdered skimmed milk, 1% of glucose, 0.1% of yeast extract, $\frac{1}{200}$ M of $CaCl_2$ was inoculated with a strain belonging to *Mucor pusillus* Lindt, and after 4 days shaking culture at 30° C., the mycelium was separated by filtration, and an enzyme solution was obtained. The activity of this enzyme solution was 115 Soxhlet units/ml. Thus 1 ml. of it was equivalent to 0.05 mg. of rennet tablets. From this enzyme solution by a similar method as in Example 1 a purified solid enzyme preparation was obtained. Next, to 53 kg. of raw milk mixed with 17 kg. of skimmed milk which were maintained at 30° C. were added 13 grams of $KNO_3$ followed by 8.5 grams of $CaCl_2 \cdot 2H_2O$ and 1 kg. of starter. Ten minutes later, 5.5 grams of "microbial rennet" obtained as described above was added, and the same operations as in Example 1 were performed whereby was obtained 6.2 kg. of green cheese.

Example 3

The wheat bran medium described in Example 1 was inoculated with a strain belonging to Rhizopus Peka II and incubated for 4 days at 30° C., following which extraction was performed as in Example 1, the enzyme solution so obtained showing 380 Soxhlet units/ml. On the other hand, when a 10% powdered skimmed milk solution containing 1% of glucose and $\frac{1}{200}$ M of $CaCl_2$ was inocluated with this strain, shaking culture performed for 3 days at 30° C. followed by separating the mycelium by filtration, the enzyme solution obtained showed 70 Soxhlet units/ml. By means of the method described in Example 1 "microbial rennet" solution was precipitated and solidified. Using these preparations and carrying out the same process as in Example 1, cheese was obtained.

Example 4

A medium identical to that described in Example 2 was inoculated with a strain belonging to *Monascus anka*, and after 6 days shaking culture at 30° C., the mycelium was separated by filtration whereby was obtained an enzyme solution. The activity of this enzyme solution was 68 Soxhlet units/ml. Powdered "microbial rennet" was obtained from this enzyme solution by the same method as in Example 1. Using this enzyme preparation and carrying out the same process as in Example 1, cheese was obtained.

Example 5

A medium prepared by cooking and extracting 200 grams of potatoes in 1 liter of water followed by the addition of 2% of glucose and 0.1% of yeast extract was inoculated with a strain belonging to *Ascochyta visa*, and after cultivating for 4 days at 30° C. the enzyme solution obtained by separation of the mycelium by filtration showed an activity of 70 Soxhlet units/ml. This solution was treated as in Example 1 whereby powdered "microbial rennet" was obtained. This enzyme was used, and by processing as in Example 1 cheese was obtained.

Example 6

10 parts of wheat bran was mixed with 7 parts of water containing 0.5% of peptone, 0.1% of yeast extract and 1% of glucose. After cooking this mixture, it was inoculated with a strain belonging to *Sclerotium oryzae-sativa* and cultivated for 5 days at 28° C., followed by extraction as in Example 1. The enzyme solution thus obtained showed an activity of 70 Soxhlet units/ml. From this solution by the same method as in Example 1, powdered "microbial rennet" was obtained. Using this powdered enzyme and processing as in Example 1, cheese was obtained.

Example 7

The same medium as described in Example 5 was inoculated with a strain belonging to *Colletotrichum atramentarium*. After cultivating for 4 days at 30° C., the mycelium was separated by filtration whereby was obtained an enzyme solution showing an activity of 59

Soxhlet units/ml. From this solution powdered "microbial rennet" was obtained by the same method as described in Example 1. Using this powdered enzyme, cheese was obtained by processing as in Example 1.

Having thus described the nature of the invention, what is claimed is:

1. A method of making cheese which comprises cultivating on a suitable medium a fungus of *Mucor pusillus* Lindt, collecting as the chief product a milk coagulating enzyme, incorporating said enzyme in the material milk, and effecting the coagulation of said mixture.
2. A method in accordance with claim 1 wherein said medium is characterized by forming an aqueous solution having a pH in the range from about 3 to about 8.
3. A method in accordance with claim 2 wherein pH is in the range of from about 5 to about 7.
4. A method in accordance with claim 2 wherein said cultivating is carried out under aerobic conditions.
5. A method in accordance with claim 2 wherein said cultivating is carried out at a temperature in the range of from about 20° C. to about 40° C.

References Cited by the Examiner
UNITED STATES PATENTS 1,391,219  9/21  Takamine _____ 99—116

A. LOUIS MONACELL, *Primary Examiner.*